Nov. 28, 1961                H. T. PROBASCO                3,010,607
DISPENSER FOR A PLURALITY OF COMMODITIES
Filed Feb. 11, 1957                                        4 Sheets-Sheet 1
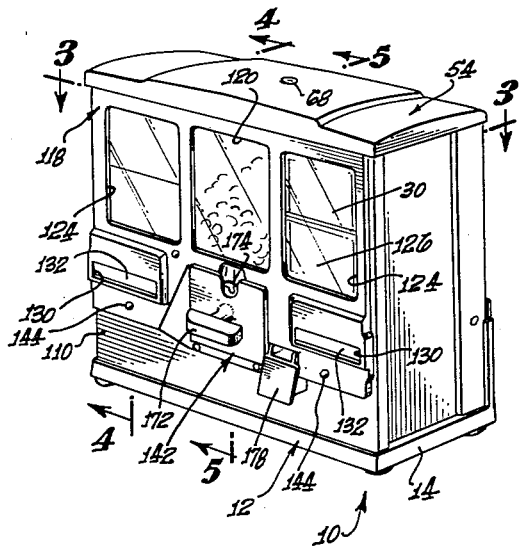
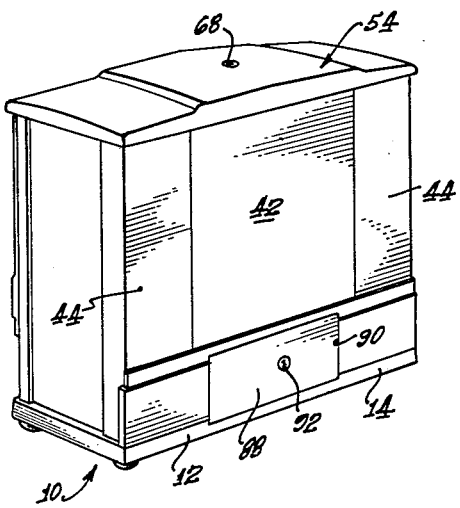
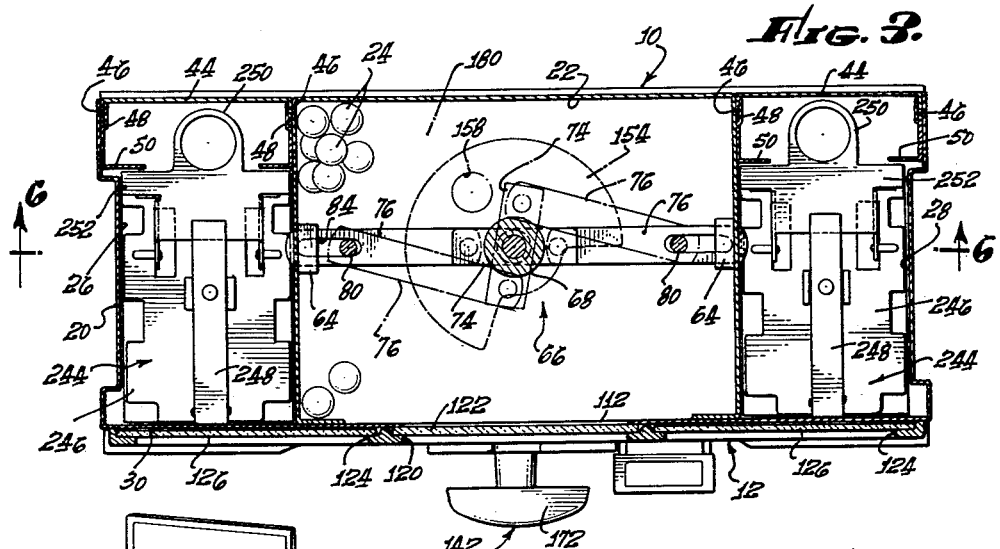
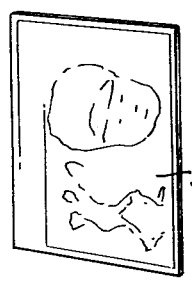
Harold T. Probasco,
INVENTOR.
By Thomas P. Maloney
ATTORNEY.

Nov. 28, 1961 H. T. PROBASCO 3,010,607
DISPENSER FOR A PLURALITY OF COMMODITIES
Filed Feb. 11, 1957 4 Sheets-Sheet 2
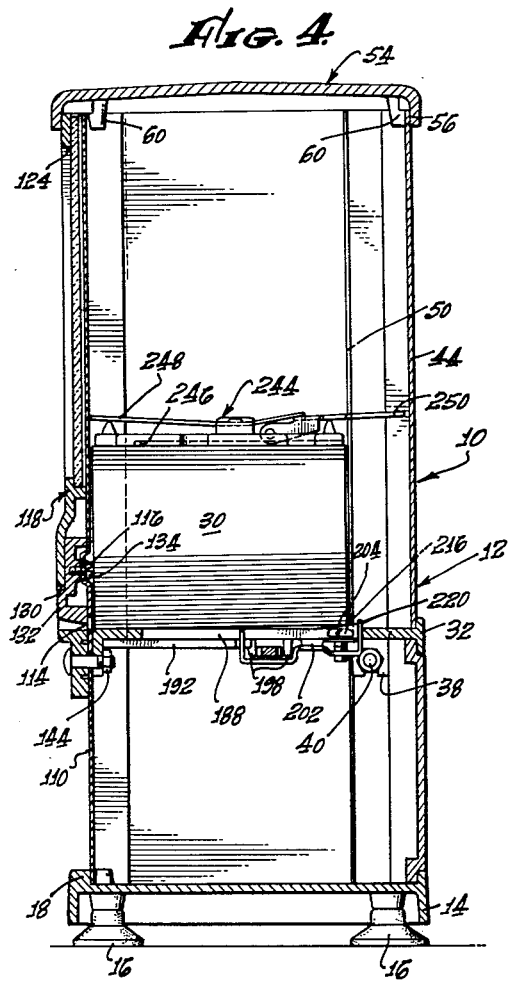
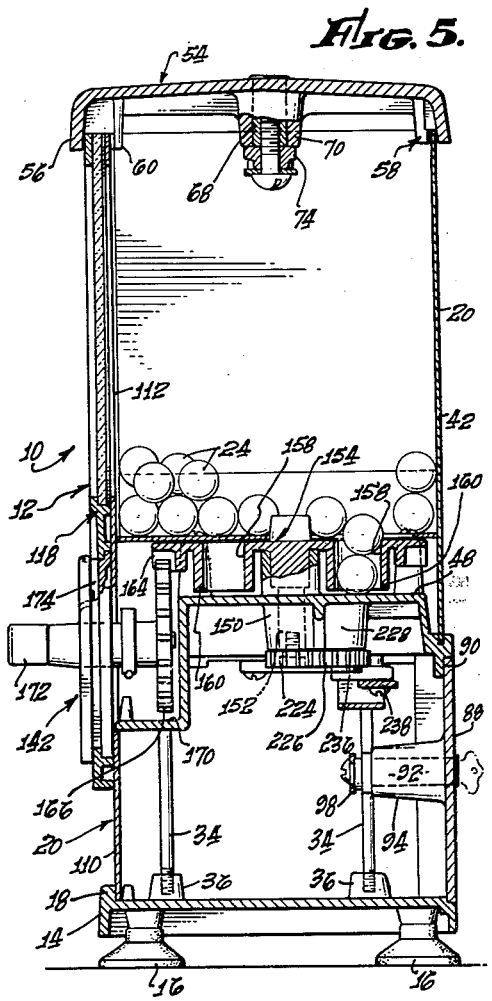
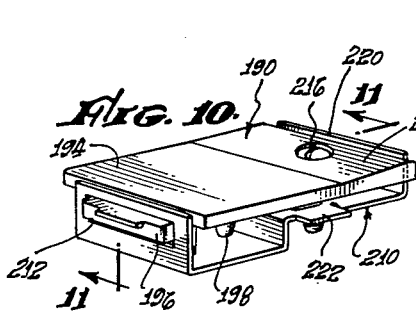
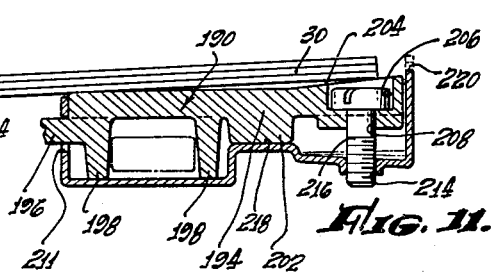
HAROLD T. PROBASCO,
INVENTOR.
By Thomas P. Maloney
ATTORNEY.

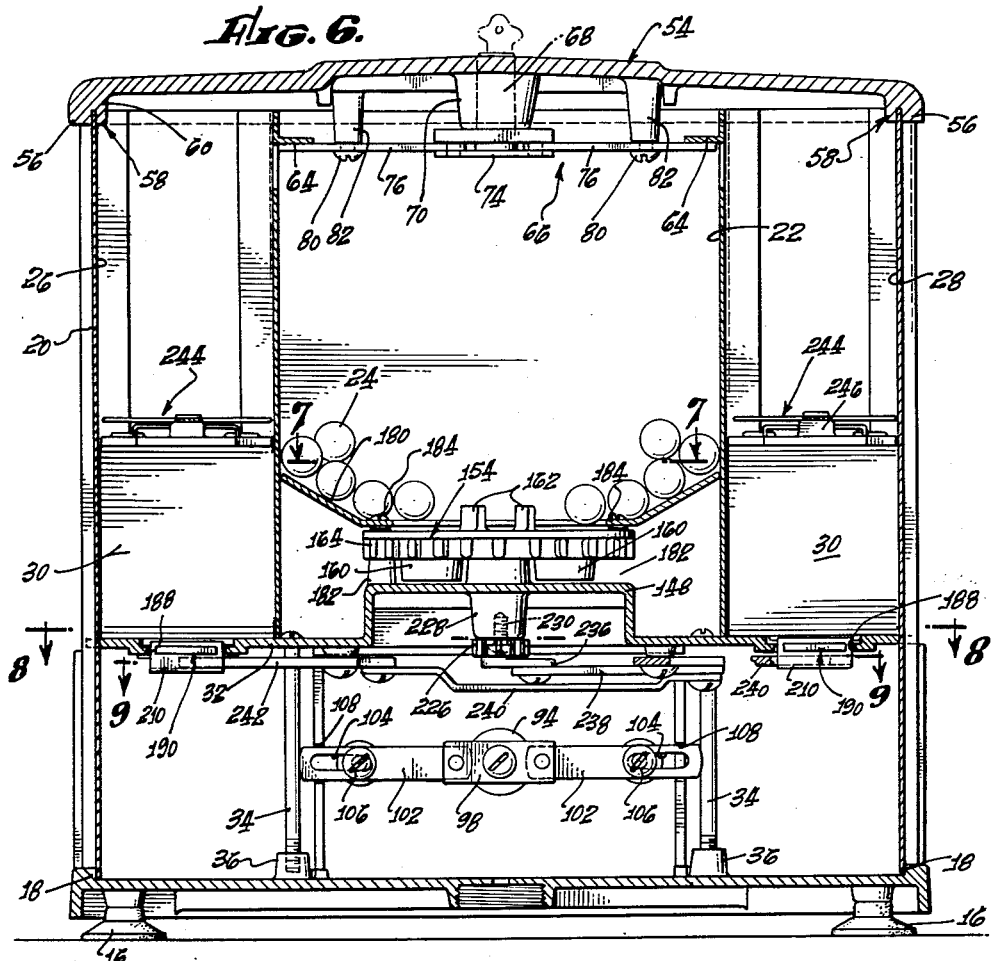
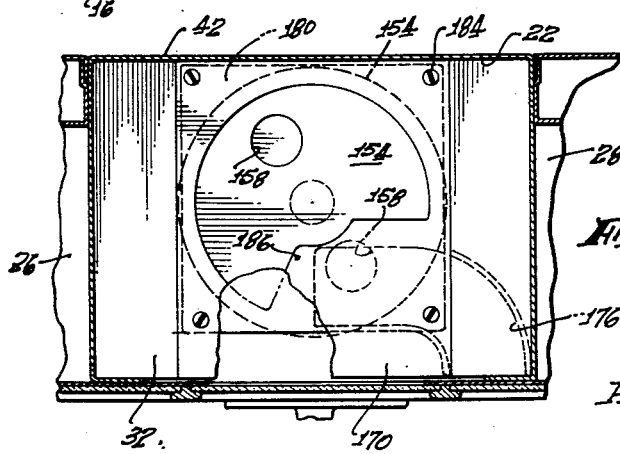

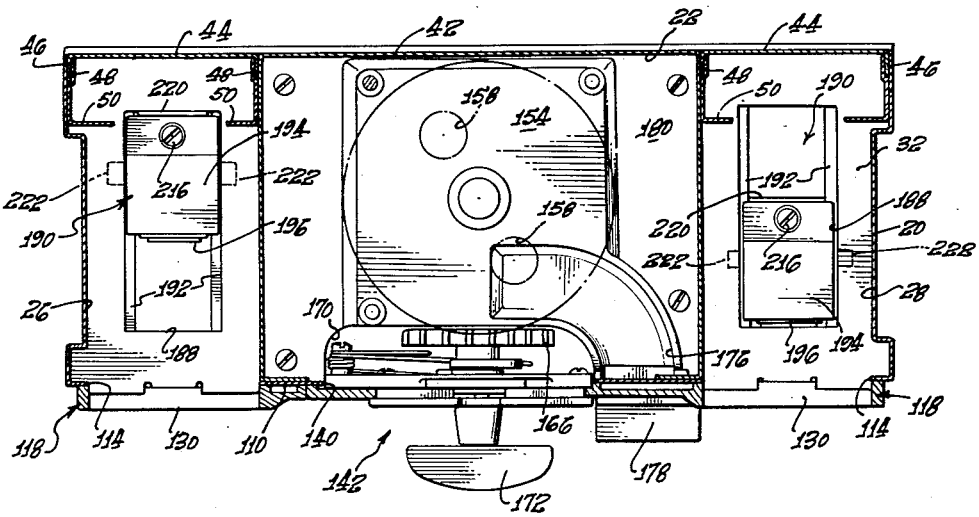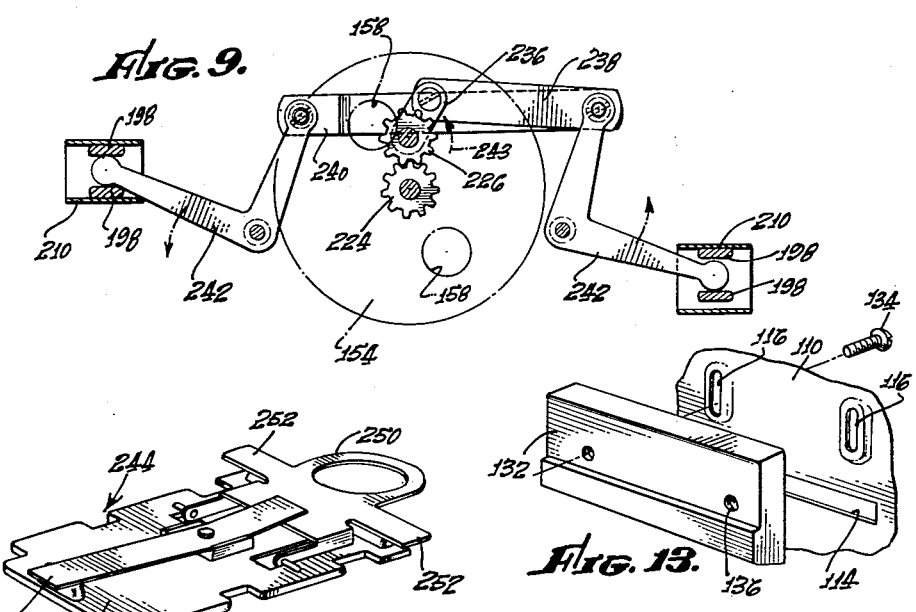

3,010,607
DISPENSER FOR A PLURALITY OF COMMODITIES
Harold T. Probasco, Los Angeles, Calif., assignor to Oak
 Manufacturing Co., Inc., Culver City, Calif., a corporation of California
Filed Feb. 11, 1957, Ser. No. 639,396
4 Claims. (Cl. 221—93)

This invention relates to a dispenser and, more particularly, to a dispenser for a plurality of commodities whereby a principal commodity can be dispensed from the dispenser simultaneously with an auxiliary commodity.

For instance, the dispenser of my invention can be utilized in dispensing or vending ball gum or candies of various types as the principal commodity and, in addition, as the auxiliary commodity can dispense various types of printed cards which may be collected by the children or other individuals using the dispenser.

It is, therefore, an object of my invention to provide a dispenser for a plurality of commodities which includes a plurality of dispensing chambers for the reception of said commodities with one of said chambers incorporating a rotary dispensing plate and the other of said chambers incorporating a reciprocable dispensing plate which is energizable simultaneously with the energization of said rotary dispensing plate to accomplish the simultaneous dispensing of a principal and an auxiliary commodity.

Another object of my invention is the provision of a dispenser of the aforementioned character wherein the drive means for energizing the rotary dispensing plate serves to simultaneously energize the reciprocable dispensing plate and wherein the reciprocable dispensing plate may be driven by a linkage energized by the rotary dispensing plate itself.

An additional object of my invention is the provision of a multiple dispenser of the aforementioned character which includes a centrally located rotary dispensing chamber incorporating a rotary dispensing plate and which has disposed on the opposite sides of said rotary dispensing chamber a pair of dispensing chambers incorporating reciprocable dispensing plates, one of which is adapted to dispense a commodity simultaneously with the dispensing of a commodity by the centrally located rotary dispensing plate.

A further object of my invention is the provision of a dispenser of the aforementioned character wherein the reciprocable dispensing plates are alternatively energizable in their associated chambers to accomplish the alternative dispensing of a commodity therefrom simultaneously with the dispensing of a commodity by the rotary dispensing plate from the rotary dispensing chamber.

The dispensing of cards or printed material is a relatively difficult task since the cards are quite thin and it is undesirable to dispense more than one card at a time since such cards are intended to serve as bonus or premium commodities in addition to the principal commodity being dispensed from the centrally located rotary dispensing chamber.

An additional object of my invention is the provision, in a dispenser of the aforementioned character, of adjustable gate means adapted to control the number of cards dispensed from the associated chamber by the reciprocable dispensing plate. An associated object of the invention is the provision of adjustable pick-off means on the reciprocable dispensing plate adapted to co-operate with said adjustable gate means and delivering to said adjustable gate means only the number of cards for which the adjustable gate means has been set.

A further object of my invention is the provision, in a dispenser of the aforementioned character, of a housing, the greater portion of which is constituted by sheet metal stampings, the housing being provided with a sheet metal front wall incorporating a plurality of openings which communicate with the interior of the respective chambers in the housing and said front wall having a front plate secured thereto which is provided with a plurality of openings corresponding with the openings in the front wall and said front plate being provided, in addition, with various types of closures which either completely close said openings in said front wall or determine the dispensing of merchandise or commodities therefrom.

Another object of my invention is the provision of a dispensing machine of the aforementioned character wherein the front plate is adapted to receive portions of the aforesaid adjustable gate means to control the dispensing of merchandise through the vending openings associated with the chambers in which the reciprocable dispensing plates are located.

While all of the chambers incorporated in the housing of the dispensing machine of my invention are open at the top, it is necessary to provide removable covers at the backs of the housings in which the reciprocable dispensing plates are located because of the difficulty encountered in the loading of the machine, and particularly said chambers, with the printed cards mentioned hereinabove.

A further object of my invention is the provision of a dispensing machine of the aforementioned character wherein the housing of said machine is provided with receptacle means adapted to receive the covers at the backs of the dispensing chambers and wherein the housing is provided with a removable top having retention means thereupon adapted to retain the removable covers in operative relationship with the housing whereby said covers cannot be removed until the removable top has been opened to permit of access to said chambers from the top thereof.

Other objects and advantages of my invention will be apparent from the following specification and the accompanying drawings which are for the purpose of illustration only and in which:

FIG. 1 is a front, perspective view of a dispensing machine constructed in accordance with the teachings of my invention;

FIG. 2 is a rear, perspective view thereof;

FIG. 3 is a top plan view taken on the broken line 3—3 of FIG. 1;

FIG. 4 is a vertical, sectional view taken on the broken line 4—4 of FIG. 1;

FIG. 5 is a vertical, sectional view taken on the broken line 5—5 of FIG. 1;

FIG. 6 is a transverse, sectional view taken on the broken line 6—6 of FIG. 3;

FIG. 7 is a fragmentary, sectional view taken from the broken line 7—7 of FIG. 6;

FIG. 8 is a transverse, sectional view taken substantially from the broken line 8—8 of FIG. 6;

FIG. 9 is a transverse, partly sectional view taken from the broken line 9—9 of FIG. 6;

FIG. 10 is a perspective view showing one of the reciprocable dispensing plates of my invention;

FIG. 11 is a transverse, sectional view taken on the broken line 11—11 of FIG. 10;

FIG. 12 is a perspective view of a typical printed card dispensed by the reciprocable dispensing plate;

FIG. 13 is an enlarged, fragmentary view showing the adjustable dispensing gate means of the dispenser of my invention; and FIG. 14 is a perspective view showing the weight means utilized to maintain the cards to be dispensed in superimposed relationship with one another.

Referring to the drawings and particularly to FIGS. 1–5 thereof, I show a dispensing machine 10 constructed in accordance with the teachings of my invention, said dispensing machine including a housing, generally indicated at 12. The housing 12 incorporates a rectangular, die-cast base 14 which, as best shown in FIGS. 4 and 5 of the drawings, is provided with a plurality of feet 16 to support the housing 12 on an appropriate surface.

The die-cast base 14 is provided at its front and sides with a peripheral, vertically directed flange 18, best shown in FIGS. 4–6 of the drawings, said flange receiving the lower extremity of a sheet metal enclosure 20 which incorporates a centrally located dispensing chamber 22 for a principal commodity such as the ball gum indicated at 24. Also incorporated in the enclosure 20 are dispensing chambers 26 and 28 disposed on opposite sides of the centrally located dispensing chamber 22 for the dispensing of an auxiliary commodity such as the printed card 30 shown in FIG. 12 of the drawings.

Located within the sheet metal enclosure 20 is a die-cast bed plate 32 which is secured, as best shown in FIGS. 5 and 6 of the drawings, in operative relationship with the die-cast base 14 by a plurality of fasteners 34 which extend through said bed plate and engage threaded bosses 36 on the upper surface of the base 14. The bed plate 32 is provided, as best shown in FIG. 4 of the drawings, with depending lugs 38 engageable by fasteners 40 projecting through the sides of the sheet metal enclosure 20 to secure the sheet metal enclosure in operative relationship with the base 14 and the bed plate 32.

All of the dispensing chambers are open at the top and the centrally located dispensing chamber 22 is provided with a rear wall 42 because ball gum 24 and similar commodities can be easily loaded into the centrally located dispensing chamber 22 from the top thereof. However, the dispensing chambers 26 and 28 are provided as best shown in FIGS. 3 and 4 of the drawings, with removable covers 44 formed from sheet metal and having inwardly directed flanges 46 receivable in corresponding receptacles 48 provided on the side walls of the chambers 26 and 28. The removable covers 44 are provided at the backs of the chambers 26 and 28 because the cards 30 cannot be dropped into the dispensing chambers 26 and 28 in the same manner as the ball gum 24 is dropped into the centrally located chamber 22, but must be stacked in said chambers in superimposed relationship.

The receptacles 48 for the flanges 46 of the covers 44 are constituted by sheet metal angles 50 whose inner extremities define the inner limits of the chambers 26 and 28 and are engageable by the inner ends of the cards 30, as best shown in FIG. 4 of the drawings.

A die-cast top 54 of rectangular configuration is located at the top of the enclosure 20 and is provided with a peripheral, depending flange 56 which overlies the exterior portion of the upper edge of the enclosure 20 and is further provided with inwardly spaced retention means 58 constituted by a plurality of prongs or protrusions 60 which, as best shown in FIGS. 4–6 of the drawings, engage the inner surface of the upper edge of the enclosure 20 and serve to prevent inward deflection of said enclosure 20 at its upper edge. Thus, the need for stiffening or reinforcing the upper edge of the enclosure is eliminated and this vital function is accomplished by the provision of the retention means 58 on the underside of the top 54.

An additional function is served by the retention means 58 and the downwardly depending protrusions 60 constituting the same in that said retention means 60 engage the upper ends of the removable covers 44 at the backs of the dispensing chambers 26 and 28, as best shown in FIG. 4 of the drawings, to maintain said covers in operative relationship with said chambers. Therefore, until the top 54 is released from the top of the enclosure 20, the covers 44 cannot be removed from operative relationship with their respective chambers 26 and 28.

A pair of outstruck, right-angularly bent lugs 64 is formed in the opposite side walls of the centrally located dispensing chamber 22, said lugs being engageable by locking means, generally indicated at 66, and mounted on the underside of the top 54 of the dispensing machine 10. The locking means 66 includes a cylinder lock 68 mounted in a depending boss 70 on the top 54 and said cylinder lock having secured to the lower extremity thereof a rotatable crank 74 whose opposite sides have locking levers 76 secured thereto. The locking levers 76 have their outer extremities mounted for movement on the shanks of fasteners 80 which are mounted in threaded bosses 82, as best shown in FIG. 6 of the drawings.

Slots 84 are provided in the outer extremities of the locking levers 76, as best shown in FIG. 3 of the drawings, to permit the relative movement of the locking levers 76 and the crank 74 into locked and unlocked positions, as graphically illustrated in FIG. 3 of the drawings. When the cylinder lock 68 is rotated to cause the outward movement of the outer extremities of the locking levers 76 into engagement with the lugs 64, the top 54 of the housing 12 is maintained in operative relationship therewith. However, when the crank 74 is rotated into the dash line position shown in FIG. 3 of the drawings, the locking levers 76 are withdrawn from operative relationship with the lugs 64, thus releasing said levers from the lugs and permitting removal of the top 54 from operative relationship with the housing 12 of the dispensing machine 10.

A rectangular closure 88 is provided for an opening 90 in the back of the housing 12 and a cylinder lock 92 is mounted in a boss 94 formed on said closure, as best shown in FIGS. 5 and 6 of the drawings. Secured to the cylinder lock 92 is a crank 98 which has locking levers 102 secured to the opposite extremities thereof. The outer extremities of the locking levers 102 are provided with elongated slots 104 engageable by fasteners 106 and when the locking levers 102 are in locked position, as best shown in FIG. 6 of the drawings, the outer extremities thereof engage lugs 108 provided on the interior of the housing 12 to maintain the closure 88 in operative relationship therewith.

Since the portion of the housing underlying the bed plate 32 serves as a coin receptacle, the cylinder lock 92 need merely be rotated to withdraw the outer extremities of the locking levers 102 from operative engagement with the lugs 108 to permit the closure 88 to be removed from the opening 90 and permit access to be had to the coins deposited therein.

The front wall 110 of the enclosure 20 is provided with a centrally located viewing opening 112 therein, as best shown in FIGS. 3 and 5 of the drawings, said viewing opening being registered with the centrally located dispensing chamber 22 to permit a user of the device to ascertain whether there is a supply of a desired commodity in the centrally located dispensing chamber 22. Also provided in the front wall 110 are dispensing openings or slots 114 which, as best shown in FIGS. 4, 8, and 13 of the drawings, communicate with the lower ends of the chambers 26 and 28 to permit printed cards or other commodities to be dispensed from said chambers, in a manner to be described in greater detail below.

Adjustment slots 116 are formed in the front wall 110 adjacent the openings 114, again for a purpose which will be described in greater detail below.

Mounted in operative relationship with the front wall 110 of the housing enclosure 20 is a front plate 118, said front plate being formed by die-casting, or a similar process, and incorporating a centrally located viewing opening 120 which is coincident with the viewing opening 112 in the front wall 110. When a pane of glass 122 is inserted between the front plate 118 and the front wall 110, the contents of the centrally located dispensing chamber 22 can be observed. Also provided in the front plate 118 are auxiliary openings 124 behind which panes of glass 126 are located. The printed cards 30 can be inserted between the panes of glass 126 and the front wall 110 to permit the user of the dispensing machine 10 to perceive the type of card which will be dispensed from the machine.

A pair of openings 130 is formed in the front plate 118 adjacent the lower end thereof, said openings overlying the dispensing opening 114 in the front wall 110 and being adapted to receive adjustable gates 132 which are mounted, as best shown in FIGS. 4 and 13 of the drawings, by screws 134 which pass through the adjustment slots 116 into threaded openings 136 in said gates.

It is obvious that by loosening the screws 134, the gates 132 can be moved upwardly or downwardly in respect to the dispensing openings 114 in the front wall 110 by virtue of the location of the shanks of the screws 134 in the adjustment slots 116. In this manner, the width of the opening 114 adjacent a gate 132 can be controlled to control the dispensing of cards 30 therethrough.

There is also provided in the front wall 110 a centrally located opening 140 which receives an actuating or drive means 142 whose component parts and operation will be described in greater detail below.

The front plate 118 is maintained in operative relationship with the front wall 110 by means of fasteners 144, as best shown in FIG. 4 of the drawings. The bed plate 32 is provided with a centrally located platform 148, said platform having a bearing boss 150 formed integrally therewith for the reception of the shaft 152 of a rotatable dispensing plate 154, as best shown in FIGS. 5 and 6 of the drawings. The rotatable dispensing plate 154 includes a pair of oppositely disposed discharge or dispensing openings 158 defined, as best shown in FIG. 5 of the drawings, by downwardly depending bosses 160. Agitator lugs 162 project upwardly to engage the ball gum 24 and urge it toward the opening 158.

The rotatable dispensing plate 154 is also provided on its periphery with gear teeth 164 which are engaged by a drive gear 166 located in a well 170 formed at the front of the bed plate 32 intermediate the ends thereof and adapted to be rotated by an actuator handle 172. Therefore, rotation of the actuator handle 172, as permitted by a coin deposited in a slot 174 in the dispensing machine 10, will cause simultaneous rotation of the drive gear 166 and concomitant rotation of the rotatable dispensing plate 154.

The bed plate 32 is provided, as best shown in FIGS. 7 and 8 of the drawings, with a dispensing chute 176 whose inner extremity underlies the path of rotation of the dispensing openings 158 in the rotatable dispensing plate 154 so that, as the dispensing openings 158 are registered with the inner extremity of the dispensing chute 176, a piece of ball gum 24 is discharged through the dispensing chute to a hinged closure 178 which can be raised to permit access to be had to the gum.

Direct access of ball gum 24 to the inner extremity of the dispensing chute 176 is prevented by a shield 180 formed of sheet metal or the like and mounted on posts 182 on the bed plate 32 by means of screws 184. The shield 180, as best shown in FIG. 6 of the drawings, is provided with inclined side walls which cause the ball gum 24 to roll toward the dispensing openings 158 in the rotatable dispensing plate 154 and is further provided, as best shown in FIG. 7 of the drawings, with an inwardly directed wiper plate 186 which overlies the dispensing openings 158 in registry with the inner extremity of the dispensing chute 176 to prevent more than one ball of gum from being dispensed therefrom.

Elongated rectangular openings 188 are formed in the opposite extremities of the bed plate 32, as best shown in FIGS. 4, 6, and 8 of the drawings, said openings underlying and being located at the lower extremities of the dispensing chambers 26 and 28 and having reciprocable dispensing plates located therein and constituted by substantially rectangular shuttles 190.

Since the construction and operation of the shuttles 190 and their movement in the openings 188 is identical, the description of the shuttle 190 located in the lower end of the dispensing chamber 26 will suffice for a description of the identical shuttle located in the lower end of the dispensing chamber 28.

The opposite sides of the opening 188 are provided with depressed flanges 192 which serve as tracks for the opposite edges of the shuttle 190 and which permit the upper surface of said shuttle to be located in flush relationship with the adjacent surface of the bed plate 32.

The shuttle 190, as best shown in FIGS. 10 and 11 of the drawings, includes a substantially rectangular body 194 on the forward edge of which there is provided a rectangular protuberance 196. Formed on the underside of the body 194 are spaced projections 198 and adjacent said projections is provided a downwardly extending boss 202.

The inward extremity of the upper surface of the body 194 of the shuttle 190 is inclined upwardly, as at 204, and a recess 206 is formed therein communicating with a bore 208 formed in the inner extremity of the body 194.

Mounted is operative relationship with the body 194 of the shuttle 190 is a shuttle cap 210 which has an opening 212 formed in the forward extremity thereof for the reception of the protuberance 196 and which is provided on its inner extremity with a threaded bore 214 for the reception of a fastening and adjustment screw 216 located in the recess 206 and projecting through the bore 208 in the body 194. A pad 218 is formed on the cap 210 intermediate the extremities thereof and rests upon the boss 202.

The inner extremity of the cap 210 is provided with a vertically oriented pick-off portion 220 whose upper extremity projects beyond the plane of the inclined portion 204 of the supper surface of the body 194 and is adapted to engage a card or cards 30 resting on the bed plate 32 at the bottom of the dispensing chamber 26. The pick-off portion 220 can be adjusted by proper rotation of the adjustment screw 216 which will cause the upper extremity of the pick-off portion 220 to be raised or lowered with respect to the adjacent surface of the body 194. Thus, if it is desired to dispense two cards, the pick-off portion 220 can be adjusted correspondingly, or if the cards being dispensed are thicker than those previously dispensed corresponding adjustment of the pick-off portion 220 can be made.

It will be noted that during the adjustment the contacting pad 218 on the cap 210 engages the boss 202 on the body 194 of the shuttle 190 and the boss 202 serves as a fulcrum to facilitate the deflection of the pick-off portion 220 of the cap 210.

The cap 210 is also provided, as best shown in FIGS. 6, 8, and 10 of the drawings, with laterally projecting tabs 222 which engage the underside of the bed 32 adjacent the opening 188 and maintain the shuttle 190 in operative relationship therewith. Secured to the lower extremity of the shaft 152 on the rotatable dispensing plate 154 is a gear 224 which, as best shown in FIGS. 5–6 and 9 of the drawings, engages a corresponding gear 226 mounted for rotation on a boss 228 on the underside of the bed plate 32 by means of a screw 230, as best shown in FIG. 6 of the drawings.

Formed integrally with the gear 226 is a crank 236 which is pivotally connected to a connecting link 238, as best shown in FIG. 9 of the drawings. The connecting link 238 is connected, in turn, to a drag link 240 which has its opposite ends secured to pivotally mounted bellcranks 242 whose free ends are located between the spaced projections 198 on the underside of the shuttles 190.

Therefore, when rotation of the rotary dispensing plate 154 is initiated by energization of the gear 166 incorporated in the drive means 142, simultaneous rotation of the gears 224 and 226 will take place causing concomitant rotation of the crank 236 and longitudinal movement of the connecting link 238 which is accompanied by corresponding longitudinal movement of the drag link 240.

When the gear 226 is rotated in a counterclockwise direction, as indicated by the arrow 243 in FIG. 9 of the drawings, the inner extremity of the right-hand bellcrank 242 will be drawn to the left causing inward counterclockwise movement of the outer extremity of said bellcrank and retraction of the shuttle 190 driven thereby. Simultaneously, the inner extremity of the left-hand bell crank 242 will be drawn to the left causing outward movement of said extremity and outward movement of the shuttle 190 connected thereto. Thus, each rotation of the dispensing plate 154 is accompanied by outward movement of one of the shuttles 190 toward its associated dispensing opening 130 and inward or retractive movement of the other shuttle 190. The outwardly moving shuttle 190 will dispense a card 30 while the inwardly moving shuttle will be disposed in a position to pick up another card 30.

Located in each of the dispensing chambers 26 and 28 is a follower weight 244 which includes a body 246 adapted to be superimposed upon the uppermost of a pile of superimposed cards 30 and to maintain said cards in compact relationship with one another whereby a lowermost card will always be presented to the pick-off portion 220 on the shuttle 190 so that it can be delivered to the dispensing openings 114 in the front wall 110 and 130 in the front plate 118.

A leaf spring 248 is mounted on the upper surface of the body 246 and has its outer extremity engageable with the inner surface of the front wall 110. Thus, the leaf spring 248 serves to prevent inadvertent upward movement of the follow-up weight 244 since it wedges against the inner surface of the front wall 110 of the housing enclosure 20.

A pivotally mounted finger grip 250 is provided on the inner extremity of the follower weight 244 and incorporates laterally extending tabs 252 which engage the adjacent surfaces of the angles 50, as best shown in FIG. 3 of the drawings, and thus assist in locating the body 246 of the follower weight 244 in the proper position within the associated dispensing chamber. The inner extremity of the leaf spring 248 serves to bias the finger grip 250 downwardly into a position in which the tabs 252 will be operative. However, when it is desired to remove the follower weight 244, the finger grip portion 250 is grasped and pivoted upwardly against the bias of the leaf spring 248 which serves to move the tabs 252 from operative relationship with the angles 50 and thus permits the follower weight 244 to be readily removed from an associated dispensing chamber.

Operation of the dispensing machine is initiated by the dropping of a coin into the slot 174 which permits the actuating handle 172 to be rotated to cause corresponding rotation of the gear 166 driven thereby. The gear 166 induces rotation of the rotatable dispensing plate 154 to cause a ball of gum 24 located in one of the receptacles or openings 158 in the plate 154 to be carried under the wiper plate 186 and thus to the inner extremity of the dispensing chute 176 to permit it to roll under gravity to the closure 178 at the end of said chute.

Rotation of the rotary dispensing plate 154 is accompanied by corresponding rotation of the gear 224 secured to the lower extremity of the shaft 152 which causes concomitant rotation of the gear 226 and the bellcrank 236 formed integrally therewith. Longitudinal movement of the connecting link 238 and the associated drag bar 240 causes rotation of the bellcranks 242 in opposite directions in that when the end of one bellcrank is moving outwardly to cause outward movement of an associated shuttle 190, the outer end of the other bellcrank is moving inwardly to retract the shuttle 190. Therefore, as the rotary dispensing plate 154 is rotated, one or the other of the shuttles 190 is always being advanced to dispense a card 30 through the coincident dispensing openings 114 and 130.

I thus provide by my invention a dispensing machine which is characterized by its simplicity of construction and ease of operation and which is also capable of dispensing a principal and auxiliary commodity simultaneously, the auxiliary commodity serving as a bonus payment to the user of the machine.

I claim as my invention:

1. In a dispenser, the combination of: a housing, said housing incorporating a bed plate extending from one side to the other thereof and said bed plate underlying a centrally located magazine and a pair of side magazines disposed on opposite sides thereof, said housing having a front wall incorporating dispensing apertures communicating, respectively, with said centrally located magazine and said side magazines; a cover on said housing covering said centrally located and said side magazines; a coin receiver mounted in the front wall of said housing having a drive gear secured thereto; a rotary dispensing plate mounted on said bed plate and disposed in said centrally located magazine, said rotary dispensing plate being engageable by said drive gear to cause the rotation of the same; a drive shaft on said rotary dispensing plate depending through said bed plate; a driving linkage operatively connected to said drive shaft; and a reciprocable dispensing plate mounted in each of said side magazines and supported on said bed plate, said reciprocable dispensing plates being operatively connected to said driving linkage to cause the opposite reciprocation of said reciprocable dispensing plates simultaneously with the rotation of said rotary dispensing plate.

2. In a dispenser, the combination of: a housing having a bottom, front and back walls and side walls and a bed plate supported on said walls in spaced relationship with said bottom and having a centrally located bearing opening therein and a pair of reciprocable dispensing plate receiving openings on opposite sides of said bearing opening; a centrally located article receiving magazine overlying said bed plate in communication with said bearing opening; side magazines overlying said bed plate in communication with said reciprocable dispensing plate receiving openings, said housing having a dispensing opening for each magazine on said front wall thereof; a common cover on said housing for closing off all of said magazines; a coin receiver mounted on said front wall having a drive gear above a portion of said bed plate; a rotary dispensing plate having a shaft depending through said bearing opening in said bed plate and located in said centrally located magazine, said rotary dispensing plate being engageable by said drive gear to rotate the same; reciprocable dispensing plates mounted in each of said openings therefor in said bed plate at the bottoms of said side magazines; and a drive linkage mounted on the underside of said bed plate and connected to said shaft on said rotary dispensing plate whereby rotation of said dispensing plate by said drive gear will cause simultaneous energization of said drive linkage to reciprocate said reciprocable plates in their associated openings in opposite directions to discharge merchanise simultaneously from said centrally located magazine and one of said side magazines.

3. In a dispenser, the combination of: a housing having a bottom, front and back walls and side walls and a bed plate supported on said walls in spaced relationship with said bottom and having a centrally located bearing opening therein and a pair of reciprocable dispensing plate receiving openings on opposite sides of said bearing opening; a centrally located article receiving magazine overlying said bed plate in communication with said bearing opening; side magazines overlying said bed plate in communication with said reciprocable dispensing plate receiving openings, said housing having a dispensing opening for each magazine on said front wall thereof; a common cover on said housing for closing off all of said magazines; a coin receiver mounted on said front wall having a drive gear above a portion of said bed plate; a rotary dispensing plate having a shaft depending through said bearing opening in said bed plate and located in said centrally located magazine, said rotary dispensing plate being engageable by said drive gear to rotate the same; reciprocable dispensing plates mounted in each of said openings therefor in said bed plate at the bottoms of said side magazines; and a drive linkage mounted on the underside of said bed plate and connected to said shaft on said rotary dispensing plate whereby rotation of said dispensing plate by said drive gear will cause simultaneous energization of said drive linkage to reciprocate said reciprocable plates in their associated openings in opposite directions to discharge merchandise simultaneously from said centrally located magazine and one of said side magazines, said drive linkage including a first gear on said shaft of said rotary dispensing plate and a second gear supported on the underside of said bed plate for rotation by said first gear and a drag link operatively connected to said second gear through a connecting link, the opposite extremities of said drag link being pivotally connected to bellcranks mounted on the underside of said bed plate and having their extremities engaged upon said reciprocable dispensing plates.

4. In a dispenser, the combination of: an elongated rectangular housing having a bottom, front and back walls and side walls and a bed plate disposed in spaced relationship with said bottom and extending between said front and back walls and said side walls, said bed plate being secured to said bottom and having a centrally located bearing opening therein and reciprocable dispensing plate receiving openings on opposite sides of said bearing opening; a centrally located ball magazine on said bed plate and a pair of card magazines on opposite sides of said ball magazine, said front wall of said housing having a dispensing opening communicating with each of said magazines; a rotary dispensing plate in said ball magazine having a shaft depending through said bearing opening in said bed plate; a reciprocable dispensing plate mounted in each of said openings in said bed plate at the bottom of the associated card magazine; a coin receiver mounted on said front wall having a drive gear thereupon engageable with said rotary dispensing plate; and a driving mechanism supported below said bed plate for driving said reciprocable dispensing plates in opposite directions simultaneously with the rotation of said rotary dispensing plate including a first gear connected to the shaft on said rotary dispensing plate, a second gear engaged by said first gear and supported below said bed plate, a connecting link connected to said second gear, a bellcrank connected to each of said reciprocable dispensing plates, and a drag link connected to said bellcranks and said connecting link.

References Cited in the file of this patent

UNITED STATES PATENTS

| | | |
|---|---|---|
| 465,908 | Whiteside | Dec. 29, 1891 |
| 640,112 | Dennis | Dec. 26, 1899 |
| 780,418 | Garlick et al. | Jan. 17, 1905 |
| 935,401 | Petersen | Sept. 28, 1909 |
| 1,160,557 | Wilton | Nov. 16, 1915 |
| 1,330,267 | Hruska | Feb. 10, 1920 |
| 1,434,061 | Lewis | Oct. 31, 1922 |
| 1,591,637 | Matheson | July 6, 1926 |
| 1,593,906 | Lorentzen | July 27, 1926 |
| 1,601,376 | Sherer | Sept. 28, 1926 |
| 1,626,999 | Wynn | May 3, 1927 |
| 1,701,320 | Bohlig | Feb. 5, 1929 |
| 1,731,325 | Stevens | Oct. 15, 1929 |
| 2,129,185 | Simmons | Sept. 6, 1938 |
| 2,361,977 | Stair | Nov. 7, 1944 |
| 2,380,533 | Lebrecht | July 31, 1945 |
| 2,400,104 | Compton et al. | May 14, 1946 |
| 2,439,550 | Smith | Apr. 13, 1948 |
| 2,462,298 | Alexander | Feb. 22, 1949 |
| 2,501,434 | Cameron | Mar. 21, 1950 |
| 2,706,028 | Jenner | Apr. 12, 1955 |
| 2,728,434 | Fry | Dec. 27, 1955 |

FOREIGN PATENTS

| | | |
|---|---|---|
| 137,465 | Australia | May 31, 1950 |